United States Patent [19]

Stahl

[11] 4,182,222
[45] Jan. 8, 1980

[54] COUPON CONFINING BAG METHOD

[76] Inventor: Robert L. Stahl, 3843 Grace La., Glenview, Ill. 60025

[21] Appl. No.: 878,478

[22] Filed: Feb. 16, 1978

[51] Int. Cl.² .............................................. B31B 1/72
[52] U.S. Cl. .................................. 93/35 R; 53/553; 93/8 WA; 156/272; 156/290; 156/303; 156/324; 156/554
[58] Field of Search .............. 93/35 R, 35 PC, 33 H, 93/8 WA, DIG. 1; 53/452, 450, 553; 156/290, 272, 324, 303, 554

[56] References Cited

U.S. PATENT DOCUMENTS

| | | | |
|---|---|---|---|
| 2,260,064 | 10/1941 | Stokes | 93/35 PC X |
| 3,168,016 | 2/1965 | Kehr | 93/8 WA |
| 3,199,551 | 8/1965 | Hall et al. | 53/553 X |
| 3,735,551 | 5/1973 | Pratt | 53/553 X |
| 3,892,614 | 7/1975 | Levy | 156/272 |
| 3,998,135 | 12/1976 | Sargent | 93/35 R |

*Primary Examiner*—James F. Coan
*Attorney, Agent, or Firm*—Tilton, Fallon, Lungmus & Chestnut

[57] ABSTRACT

A coupon confining bag method wherein two continuous flexible thermoplastic webs are advanced toward one another for superposition, one web being wider with the narrower web being transparent; the webs are longitudinally sealed along one edge of the narrower web, coupons inserted between the webs transversely, the webs thereupon being longitudinally sealed together along the other edge of the narrower web and the wider web being transversely sealed and severed between adjacent coupons.

3 Claims, 3 Drawing Figures

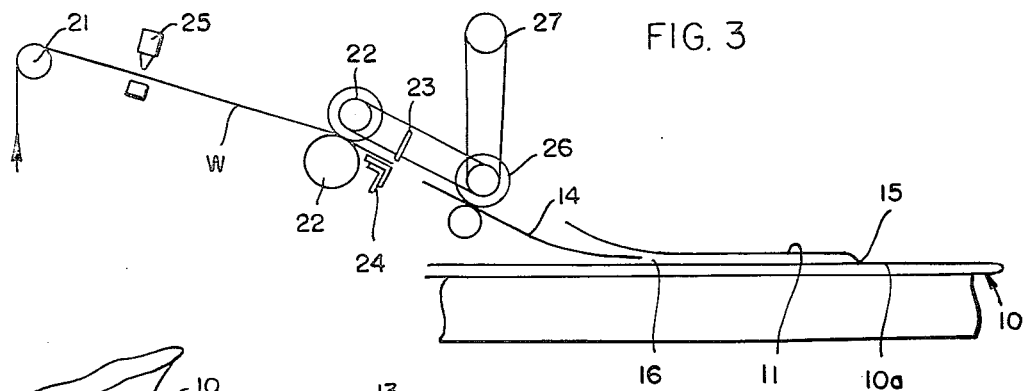
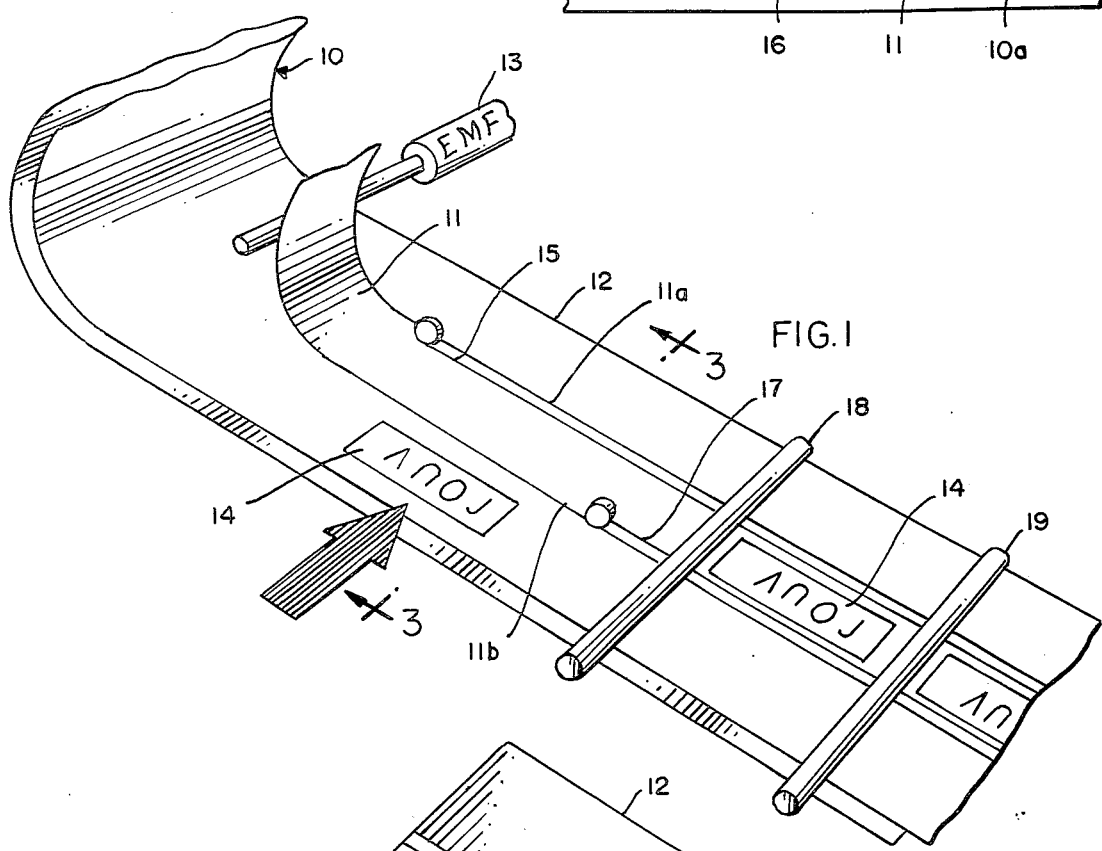
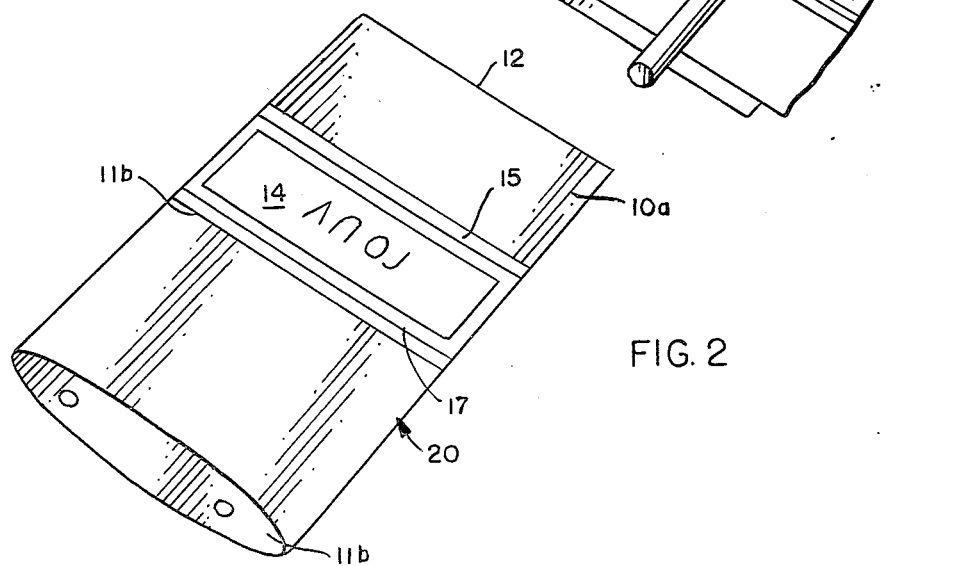

COUPON CONFINING BAG METHOD

BACKGROUND AND SUMMARY OF INVENTION

This invention relates to a method of producing bags and, more particularly, to a method of producing coupon-confining bags.

Many merchandisers have desired to include coupons in flexible packages particularly packages of the type used for foods such as bread. The insertion of the coupon during the food packaging operation has led to difficulties in material handling besides possible soiling, defacing, or otherwise rendering the coupon less attractive in marketing. The problem was partially solved with the advent of new methods of packaging such as those disclosed and claimed in commonly owned U.S. Pat. Nos. 3,762,628 and 3,998,135. The provision of a separate compartment for the coupon at a point in the fabrication of the bag itself achieved a desirable separation of function. However, the coupon could at times become dislodged or, in some instances, removed from the package prior to actual purchase of the products so packaged resulting in increased expense and frustration to merchandisers trying to develop attractive couponing programs.

While these problems have been annoying, the potential for merchandising in this manner has remained attractive. It has led to a search for better methods of producing coupon-confining bags. The criteria sought to be achieved include proper placement of the coupon highly visible, assuring proper placement of the coupon, and rendering the coupon difficult to remove from the packaging prior to purchase of the goods so packaged. It is also a goal to maintain highly effective and efficient manufacturing techniques. However, the solution to the problems which have stymied the development and utilization of couponing programs of the type described were not easily overcome until discovery of the inventive method.

According to the invention, coupons can be incorporated into bags in an advantageously efficient manner while the webs constituting the bag and coupon envelope are moving in continuous automatic fashion. An important feature of the invention is to introduce the coupon from the side, i.e., transversely of the direction of movement of the bag providing webs. Included in the inventive method are the steps of advancing toward each other a pair of webs, one wider than the other and constituting at least a panel of the ultimate bag, the narrower web being directed into superposed relation with the wider web and serving as the enveloping or covering web for the coupon. The webs are longitudinally sealed along one longitudinal edge of the narrower web after which the coupons are introduced sequentially into the space between the webs and to a position adjacent the longitudinal heat seal. Thereafter, the webs are again longitudinally sealed, this time along the other longitudinal edge of the narrower web. Finally, the wider web is transversely sealed to a second panel and advantageously, simultaneously, therewith transversely severed along lines between adjacent coupons.

Other details and advantages of the invention may be seen in the ensuing specification.

DETAILED DESCRIPTION

The invention is described in conjunction with the accompanying drawing, in which FIG. 1 is a perspective somewhat schematic view of webs in the process of being united in the practice of the invention;

FIG. 2 is a coupon containing bag resulting from the practice of the invention as illustrated schematically in FIG. 1; and FIG. 3 is a sectional view of apparatus employed in the practice of the invention such as would be seen along the sight line 3—3 applied to FIG. 1.

In the illustration given a first thermoplastic web generally designated 10 is unrolled from a parent roll (not shown). In the particular illustration given, the web 10 is folded on itself at the time of entering into uniting relation with a second and narrower thermoplastic web 11. However, it will be appreciated that the folding can be accomplished later in the method or the bag can be formed of two individual panels heat-sealed together along the longitudinal edge here present as a line of folding as at 12.

As the narrower web 11 is unrolled from another parent roll (also not shown), it is passed advantageously past an electrostatic wand 13 which places the charge on the web and helps immobolize the coupons 14 as they are introduced thereunder.

However, before the coupons are introduced, the web 11 is heat-sealed as at 15 to the upper panel 10a of the web 10. This provides a barrier or a back stop against which the coupon 11 can be injected as will be described hereinafter with reference to FIG. 3. A coupon 14 is seen in the lower central portion of FIG. 1 in the process of being so inserted into the pocket or chamber 16 defined between the web 11 and the panel 10a (see FIG. 3). After the coupon has been so inserted, the narrower web 11 along the other edge 11b is heat-sealed as at 17 to the top panel 10a. Previously, the heat-seal 11 was adjacent the longitudinal edge 11a (still referring to FIG. 1). In some instances a skip-seal may be utilized at 17 to permit trapped air to escape.

Thereafter, the multi-ply continuous assembly passes under heat sealing and severing rolls or bars 18 and 19. These operate to weaken the webs so that a completed bag can be detached in the form seen in FIG. 2. There the bag is generally designated 20 and is seen to have an upper panel 10a and a lower panel 10b. The longitudinal edges of the web 11 are designated by the symbols 11a and 11b as above and the heat-seals by the numerals 15 and 17 as previously stated. Thus, by the practice of the invention, a definite, four sided pocket is advantageously achieved in a continuous, economical and foolproof manner.

Referring now to FIG. 3, it will be noted that a coupon 14 is in the process of being inserted within the pocket 16 defined by the webs 11 and 10a. For this purpose, a roll of coupons (not shown) is unreeled with the web of coupons passing over an idler 21. The unreeling is achieved by feed rolls 22 downstream of which is located a movable knife 23 and anvil 24. The knife is actuated by means of a photocell 25. When the coupon 14 has been detached from the continuous web W, it is accelerated into the pocket 16 by means of accelerator rolls 26 which may be driven advantageously through a clutched drive 27. The precise means for accelerating the coupon may take a variety of forms, viz., rolls, belts, cams, etc. Alternatively, the coupon source may be a stack of pre-cut coupons.

The invention has advantageous application to a variety of instances—there are FDA problems with other methods where paper and/or ink may be in contact with a food product—necessitating expensive FDA-approved inks and/or expensive parchment paper.

While in the foregoing specification a detailed description of an embodiment of the invention has been set down for the purpose of illustration, many variations in the details hereingiven may be made by those skilled in the art without departing from the spirit and scope of the invention.

I claim:

1. A coupon-confining bag method comprising advancing two continuous flexible thermoplastic webs toward one another for superposition, one web being wider than and extending past both longitudinal edges of the other web with at least the narrower web being transparent, longitudinally heat sealing the narrower web to the wider web along one longitudinal edge of the narrower web to develop a coupon-receiving pocket open along the other longitudinal edge of the narrower web, sequentially introducing coupons into said pocket from the open side thereof, longitudinally heat-sealing the narrower web to the wider web along the other longitudinal edge of said narrower web, and transversely severing said wider web between adjacent coupons.

2. The method of claim 1 in which said narrower web is subjected to an electrostatic charge before heat-sealing thereof to said wider web.

3. The method of claim 1 in which said wider web includes a web longitudinally folded on itself to provide a pair of panels arranged in face-to-face relation, the step of transversely severing said wider web also heat sealing said panels together.

* * * * *